United States Patent [19]

Galvin

[11] Patent Number: 5,874,939
[45] Date of Patent: *Feb. 23, 1999

[54] KEYBOARD APPARATUS AND METHOD WITH VOICE RECOGNITION

[75] Inventor: Christopher B. Galvin, Winnetka, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 762,510

[22] Filed: Dec. 10, 1996

[51] Int. Cl.$^6$ .................................................. G09G 5/00
[52] U.S. Cl. .......................................... 345/156; 704/235
[58] Field of Search .................................. 345/156, 157, 345/168; 704/235

[56] References Cited

U.S. PATENT DOCUMENTS

| | | | |
|---|---|---|---|
| 3,962,685 | 6/1976 | Belle Isle | 395/597 |
| 4,415,767 | 11/1983 | Gill et al. | 704/243 |
| 4,811,243 | 3/1989 | Racine | 345/326 |
| 4,896,358 | 1/1990 | Bahler et al. | 395/2.49 |
| 4,924,387 | 5/1990 | Jeppesen | 364/409 |
| 4,964,075 | 10/1990 | Shaver et al. | 395/887 |
| 5,023,912 | 6/1991 | Segawa | 381/43 |
| 5,054,074 | 10/1991 | Bakis | 395/2.49 |
| 5,065,390 | 11/1991 | Kelly | 364/709.12 |
| 5,212,821 | 5/1993 | Gorin et al. | 706/20 |
| 5,231,380 | 7/1993 | Logan | 340/706 |
| 5,301,227 | 4/1994 | Kamei et al. | 379/88 |
| 5,321,801 | 6/1994 | Ando | 395/145 |
| 5,329,609 | 7/1994 | Sanada et al. | 395/2.44 |
| 5,406,261 | 4/1995 | Glenn | 340/571 |
| 5,408,536 | 4/1995 | Lemelson | 382/2 |
| 5,408,582 | 4/1995 | Colier | 395/2.52 |
| 5,426,450 | 6/1995 | Drumm | 345/168 |
| 5,500,643 | 3/1996 | Grant | 345/168 |
| 5,585,823 | 12/1996 | Duchon et al. | 345/157 |
| 5,600,781 | 2/1997 | Root et al. | 395/326 |
| 5,619,708 | 4/1997 | Ho | 395/767 |
| 5,621,436 | 4/1997 | Solhjell | 345/163 |
| 5,627,530 | 5/1997 | Israel et al. | 341/21 |
| 5,659,665 | 8/1997 | Whelphley, Jr. | 395/2.84 |

FOREIGN PATENT DOCUMENTS

1{1989}-
119821  5/1993  Japan .................................. G06F 3/16

OTHER PUBLICATIONS

Anonomous, "Mouse With Ears", Research Disclosure, Kenneth Mason Publications Ltd, England, Dec. 1991.

*Primary Examiner*—Amare Mengistu
*Assistant Examiner*—Ricardo Osorio
*Attorney, Agent, or Firm*—Teri S. Hughes

[57] ABSTRACT

A standalone keyboard (101) for use with computers (102), which keyboard (101) has integral voice recognition capabilities to facilitate both text entry and cursor-movement control. The speech recognition platform (204) may be speaker dependent and/or trainable. The keyboard (101) may have an optional display (112) to facilitate certain training activities. Recognized words are converted (206) in the keyboard (101) into keystroke data that corresponds to keystroke data as would have been output had the corresponding text been entered by an operator using the keyboard keys (107).

4 Claims, 3 Drawing Sheets

KEYBOARD APPARATUS AND METHOD WITH VOICE RECOGNITION

FIELD OF THE INVENTION

This invention relates generally to computer keyboards.

BACKGROUND OF THE INVENTION

Standalone computer keyboards are well understood in the art. Such keyboards typically include a plurality of operator actuable keys that allow an operator to input both alphanumeric information and commands to a computer. Many keyboards also have a corresponding cursor-movement device such as a mouse or trackball. A well understood problem concerning such keyboards is that their usage typically requires a user to remain relatively stationary and to adopt a posture that is not always conducive to accommodating other activities.

Voice recognition has been proposed as one solution to the above problem. Typically, such prior art solutions provide a voice recognition capability in the computer itself. The user speaks into a microphone, and this audio signal is then directly input into the computer, where an on-board voice recognition platform recognizes the voice and thereafter converts that voice into either text for entry into a document or commands for controlling operation of the computer.

A number of problems have arisen with this approach. Voice recognition tends towards computational intensity, and hence can compete vigorously for processing time against other desirable processes in the computer, thereby slowing down overall processing. Better voice recognition platforms also tend to be speaker dependent; that is, the speech recognition vehicle becomes trained over time to better understand and correctly interpret a particular individual's speech. Such speaker dependent platforms, unfortunately, also tend to limit a user to the one computer that contains the trained program, thereby making it difficult to work in an ordinary and accustomed manner on various machines (in the office, at home, while traveling, and so forth). And, of course, while a particular speech recognition platform may be considered particularly effective, that platform may not be compatible with all computers then presently in use, thereby denying beneficial use of that platform to users of such computers.

Accordingly, a need exists for a way to provide the benefits of speech recognition to computer users while avoiding or at least minimizing at least some of these problems.

DESCRIPTION OF A PREFERRED EMBODIMENT

In one embodiment configured in accordance with the invention, a standalone keyboard has a keystroke data (and/ or cursor-movement data) output port, a voice input, and a plurality of operator actuable keys that are operably connected to the keystroke data output port. The keyboard also has, combined integrally therewith, a voice recognizer having an input operably coupled to the voice input and an output operably coupled to the keystroke data output port. So configured, an operator can speak into the voice input, and the voice recognizer will recognize specific spoken words contained in the operator sourced voice information and convert such specific spoken words into corresponding keystroke data. This keystroke data can then be output at the keystroke data output port to a computer in the same manner as keystroke data generated by the operator actuable keys would have been provided.

So configured, the voice recognition platform is segregated from the computer, and therefore does not compete for processing time. Further, speaker dependent recognition technology can be utilized, thereby providing effective speech recognition, while simultaneously permitting the user to operate a variety of computers in a variety of places by simply using the keyboard containing the appropriately trained speech recognition platform. These and other benefits will become more clear upon making a thorough study and review of the following more-detailed description.

Figure 1:
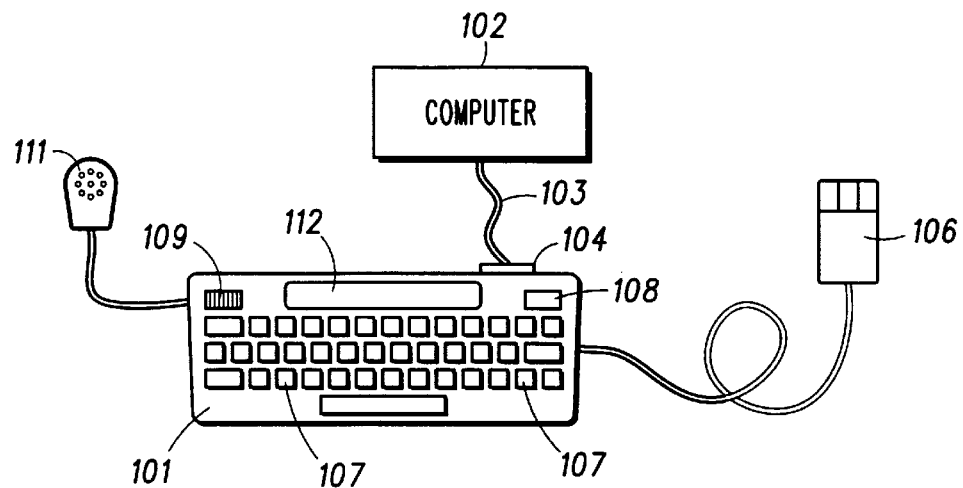
FIG. 1 comprises a block diagram depiction of a keyboard configured in accordance with the invention, wherein the keyboard is coupled to a computer.

Referring to FIG. 1, a keyboard (101) configured in accordance with the invention couples to a computer (102) via a cable (103) or other appropriate data conduit that connects to a keystroke data output port (104) on the keyboard (101) (the keystroke data output port (104) may be a serial data port or a parallel data port as well understood in the art). The keyboard (101) also couples to a cursor-movement device (106), such as a mouse, trackball, or other device as well understood in the art. The keyboard (101) has a plurality of operator actuable keys (107) as well understood in the art, and may also optionally have additional keys that are not coupled to the keystroke data output port (104), such as a command mode control key (108) and a training control key (109), both of which will be referenced in more detail below. In this embodiment, the keyboard (101) also includes a voice input (111), and may optionally include an integral alphanumeric display (112), such as an LCD display. The purpose of these elements will be made more clear below.

So configured, the keyboard (101) can be interfaced to a computer (102) in an ordinary and customary manner. The computer (102) will require no additional programming in order to allow the operator to take advantage of voice recognition data entry capabilities. And, of course, the keyboard (101) can be used with a wide variety of computers, thereby providing the operator with a significant degree of freedom.

Figure 2:
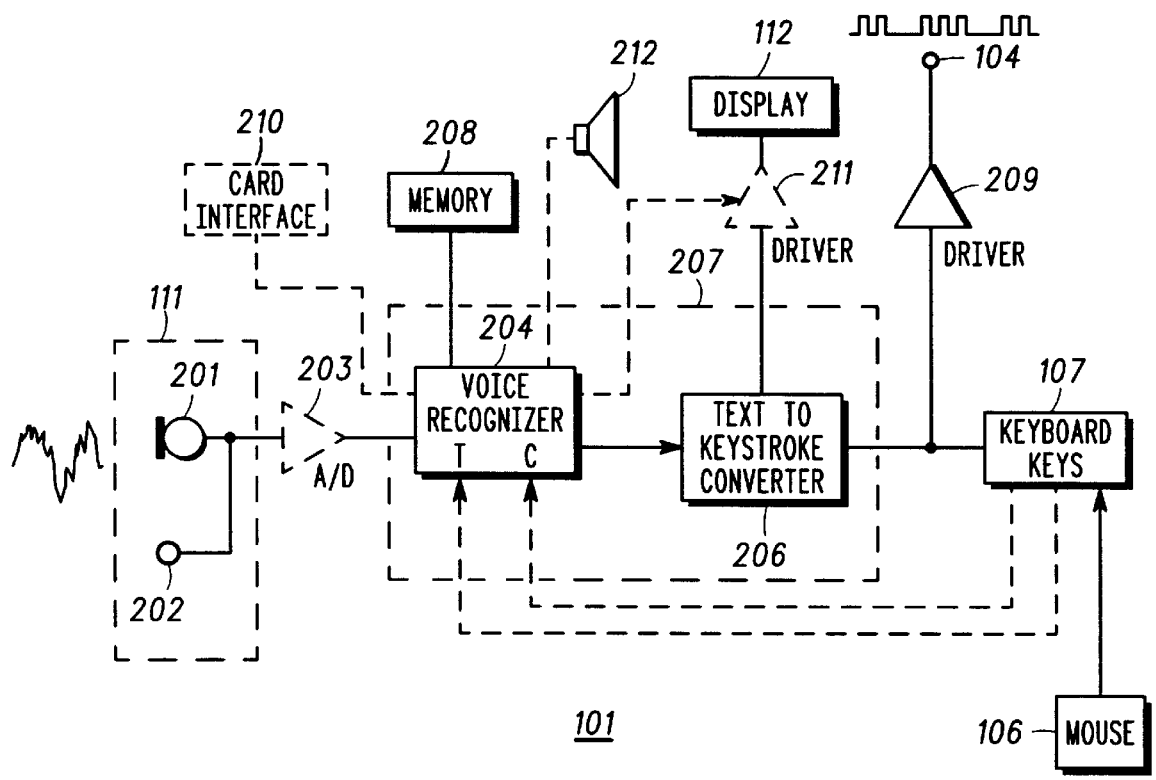
FIG. 2 comprises a block diagram depiction of a keyboard configured in accordance with the invention.

Referring now to FIG. 2, the keyboard (101) will be described in greater detail. The voice input (111) has an input that can be comprised of either an integrally combined microphone (201) and/or an audio signal input (202) that will allow a microphone of choice to be utilized therewith (for example, a headset style microphone could be utilized, particularly in a noisy environment, to improve the likelihood of correctly recognizing the operator's spoken statements). This analog voice signal would then be digitized (if the voice recognition platform did not have integral analog-to-digital conversion capabilities, a separate analog-to-digital conversion stage (203) could be provided as well understood in the art).

The keyboard (101) includes a voice recognizer (204) and a text to keystroke converter (206). These components may either reside in separate platforms (for example, appropriately programmed digital signal processors and/or microprocessors), or could be combined in a single platform (207) as might be appropriate to a particular application. The voice recognizer (204) has a corresponding memory (208) that can store, for example, information regarding patterns and their corresponding recognized text. In an application where the voice recognizer can be trained for a particular speaker, the voice recognizer (204) will of course have the ability to write to the memory (208) as well as to read the memory (208) in order to facilitate that functionality.

It should be understood that there are any number of presently known voice recognition techniques and platforms, and that any of these, (or voice recognition platforms yet to be developed and that would be appropriate for use in this application) may be utilized. The particular voice recognition technique used is not critical to the invention, and hence need not be described in greater detail here.

The text to keystroke converter (206) functions to convert the text that corresponds to recognized words and to convert them into keystroke data that corresponds identically to the keyboard data output from the keyboard keys (107) themselves. Both the text to keystroke converter (206) and the keyboard keys (107) are coupled to a driver (209) that in turn couples to and drives the keystroke data output port (104). It is the keystroke data output (104) that provides to the computer (102) the data stream (102) that corresponds to the keyboard keys (107) that have been selected by the operator and/or the corresponding keyboard keys that relate to the text that represents the spoken input of the operator.

In one embodiment, a card interface (210) can be included (this interface could be any of a number of known interfaces, including those that are compliant with the standards established by the Personal Computer Memory Card International Association). In this way, a ready facility could be provided to allow for easy upgrading of the software contents of the voice recognizer. Or, if desired, user dependent data as stored in the memory (208) could be transferred to a removable memory card via the card interface (210). The uses could then transfer those user dependent data elements to another keyboard, thus allowing immediate personal customization of the new keyboard.

In one embodiment, and particularly where training of the speech recognition platform is desirable, the text to keystroke converter (206) can couple through an appropriate driver (211) to a display (112) such that the text representing recognized words can be displayed on the keyboard (101) itself. Operational control of the driver (211) can be asserted by the voice recognizer (204) if desired. In this same context, an audible enunciator (212) as well understood in the art can also be controlled by the voice recognizer (204) in order to facilitate training activities.

And, lastly, one or more keys amongst the keyboard keys (107), such as the previously mentioned training control key (109) and command mode control key (108) as mentioned earlier can be coupled to control input (such as a training control input and/or a command mode control input) on the voice recognizer (204) to allow additional operator interface with the voice recognizer (204) to implement certain functions.

Training and command modes as associated with these keys (109 and 108) will be described in more detail below where appropriate.

The voice recognizer (204) and/or the text to keystroke converter (206) (alone or combined (207)) comprise an appropriate programmable platform in accordance with well understood art. In addition to basic voice recognition programming, other operational functionality can be programmed in accordance with the invention as well.

Figure 3:
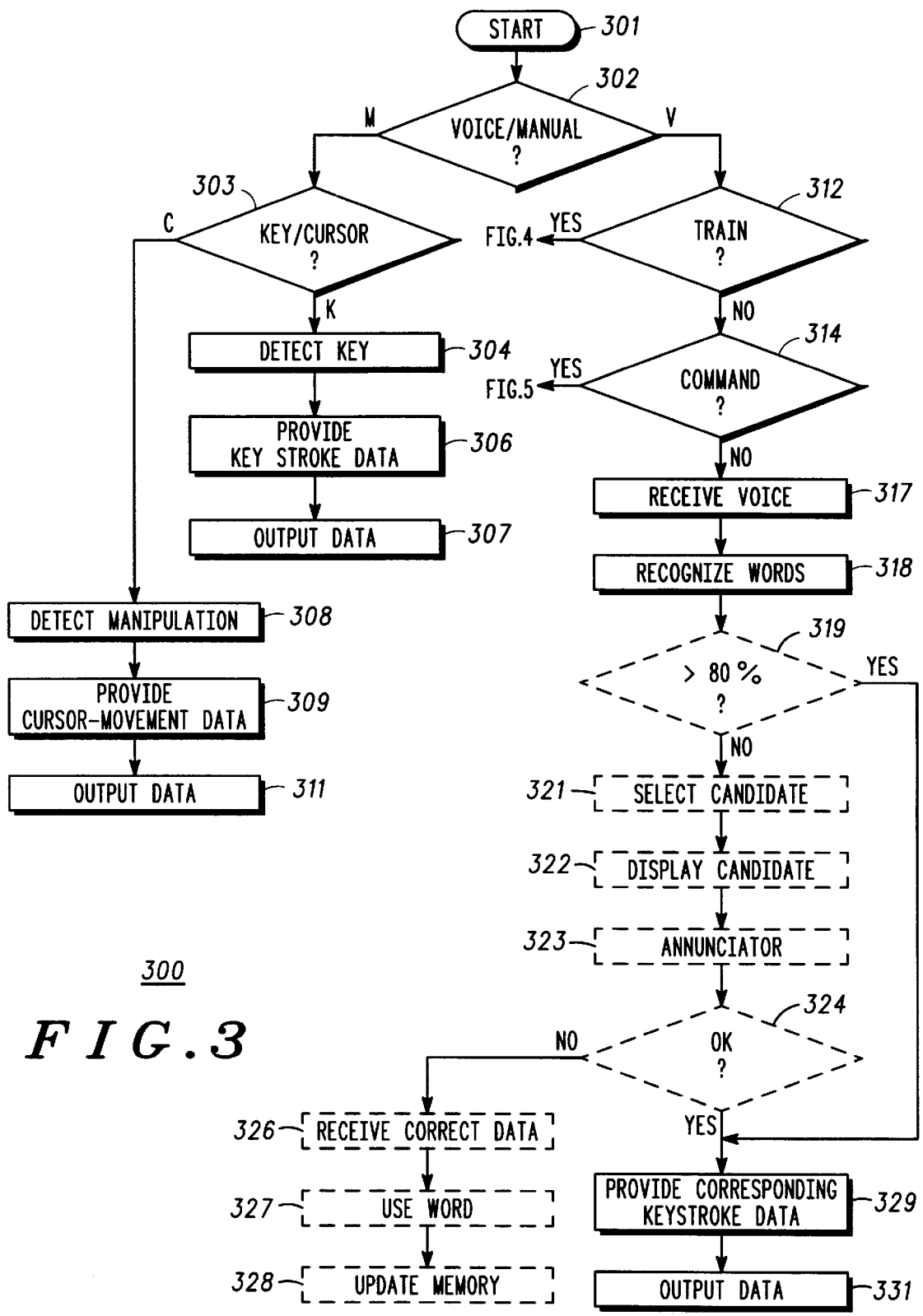
FIG. 3 comprises a flow diagram depicting operation of certain aspects of a keyboard operating in accordance with the invention.

Referring to FIG. 3, general operation of the keyboard may begin (301) with a determination (302) as to whether the operator has selected a voice input or manual input mode of operation (this determination could be made in a variety of ways, including by entry of a predetermined series of keystrokes or by selecting a particular dedicated mode key on the keyboard).

When a manual entry mode has been selected, the keyboard monitors (303) when either a key or cursor-movement device has been selected. When a key has been selected, the particular key is detected (304), and corresponding keystroke data provided (306) (such keystroke data can be provided in a variety of known ways). The keystroke data is then output (307) at the keystroke data output port (104) noted earlier. When a cursor-movement device has been manipulated, the manipulation is detected (308) and corresponding cursor-movement data provided (309), which data is again output (311) to the keystroke data output port (104).

The above steps can be accomplished in accordance with prior art technique, or, if desired, can be incorporated into the functionality of the text to keystroke converter (206).

When the operator selects (302) a voice input mode of operation, a determination (312) can be made as to whether a training mode of operation has been asserted by the operator. If so, a training mode of operation will commence (described below with reference to FIG. 4). (This training mode can be viewed as optional since it may either be dispensed with in the case of a speaker independent speech recognition platform or may be made wholly automatic.) If a training mode has not been selected, the process detects (314) whether a command mode of operation has been selected (for example, by the operator having asserted the command mode control key (108). If so, a command mode is initiated as described below with reference to FIG. 5. (Depending upon the needs of the particular application, this mode, too, may be made optional or even dispensed with.) Presuming neither special mode has been selected, the voice recognizer (204) receives (317)a voice signal via the voice input (111), and the voice recognizer recognizes (318) the spoken words.

Presuming use of a speaker dependent and/or trainable speech recognition platform, an optional automatic training mode will now be described.

Upon determining (319) that a particular recognized word has not been recognized within a predetermined degree of accuracy (for example, a greater than 80 percent likelihood of accuracy), the voice recognizer (204) can select (321) the most likely candidate word and display (322) that word on the optional keyboard display (112). To alert the operator that such has occurred, the voice recognizer (204) can also activate (323) the annunciator (212), thereby attracting the attention of the operator. (Other alert and/or advisement mechanisms could be utilized; for example, instead of a display, a voice synthesis and speaker mechanism could be provided to allow the candidate word to be audibly presented to the operator.)

The voice recognizer (204) then monitors (324) feedback from the operator as regards the candidate word (such feedback may come in the form of spoken words, by particular keyboard entries, or by use of a dedicated key on the keyboard, such as the training control key (109) described above). If the operator designates the candidate word as being incorrect, the operator can enter the correct word using the keyboard, and this correct word is received (326) by the voice recognizer (204). The voice recognizer (204) then utilizes (327) this word to complete its processing, and also updates (328) the memory (208) to include the new information, thereby correlating the new pattern with the correct word for subsequent use.

If desired, the storage function could be made non-automatic, such that an operator could elect to avoid storing particular words that are used only infrequently.

Presuming either that the original recognized word was recognized with sufficient accuracy (319), or that the displayed candidate word was, in fact, correct (324), the voice recognizer (204), via the text to keystroke converter (206), provides (329) corresponding keystroke data, which data is then output (331) to the keystroke data output port (104).

Figure 4:
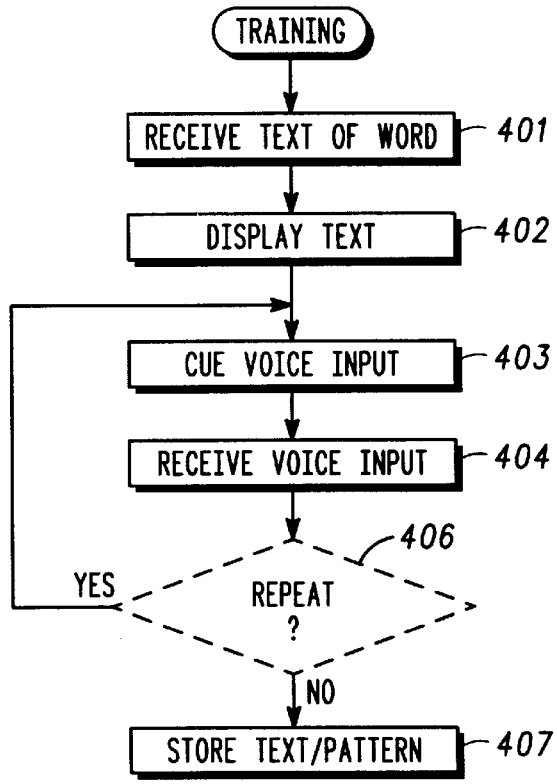
FIG. 4 comprises a flow diagram depicting operation of certain aspects of a keyboard operating in accordance with the invention.

With reference to FIG. 4, the operator selectable training mode operates by first receiving (401) the text of a particular word as input by the operator using the keyboard. This text is then displayed (402) on the keyboard display (112), and the operator cued (403) to provide corresponding voice input. This voice input is then received (404). (If desired, an optional repeat step (406) can be utilized as well understood in the art.) Upon concluding, the text and corresponding pattern can be stored (407) in the memory (208) for subsequent use.

Figure 5:
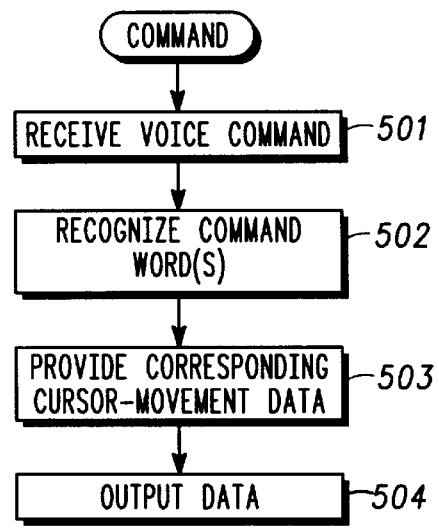
FIG. 5 comprises a flow diagram depicting operation of certain aspects of a keyboard operating in accordance with the invention.

With reference to FIG. 5, a command mode of operation as initiated by the operator allows voiced command information to be received (501), recognized (502), and then converted (503) into corresponding cursor-movement data that is again provided to the keystroke data output port (504). So configured, for example, upon entering the command mode, when the operator speaks the word "up," rather than providing keystroke equivalents for the letters "u" and "p", the process could yield cursor-movement data corresponding to upward movement of the cursor.

So configured, this keyboard will provide useful voice recognition capabilities (both for text entry and cursor control) in a manner independent of the computer platform used by the operator. The voice controlled functions (text entry and/or cursor control) can be used alone, or as mixed and combined with keyboard entered text and cursor-movement device entered cursor movement, depending upon the needs or desires of a particular user or application. The disclosed embodiment readily accommodates trainable, speaker dependent speech recognition platforms, thereby likely increasing the accuracy of the speech recognition process and rendering the operator's use of the keyboard more accurate, efficient, and satisfying. With increased accuracy of the voice recognition capability, the physical dimensions of the keyboard itself could be reduced from standard size (presuming less need to resort to the operator actuated keys themselves), hence yielding a readily transportable device. This facilitates the ability of the operator to utilize the keyboard (and its trainable user-specific voice recognition capabilities) on a variety of machines, including those in the office, at home, or while traveling.

What is claimed is:

1. In a text entry device having a voice input and voice recognition means, a method comprising the steps of:

receiving a spoken word from an operator by means of the voice input;

failing by the voice recognition means to recognize the spoken word to within a predetermined degree of accuracy;

selecting a most likely candidate word for the spoken word;

alerting the operator of the most likely candidate word;
    receiving from the operator one of:
        a confirmation indicating acceptance of the most likely candidate word; and
        an alternate word indicating rejection of the most likely candidate word;

if the confirmation is received from the operator, converting the most likely candidate word into keystroke data representing the constituent characters of the most likely candidate word;

if the alternate word is received from the operator, converting the alternate word into keystroke data representing the constituent characters of the alternate word; and outputting the keystroke data.

2. The method of claim 1 wherein the step of alerting the operator comprises displaying the text by means of an alphanumeric display.

3. The method of claim 1 wherein the step of alerting the operator comprises audibly outputting the text by means of an audio enunciator.

4. The method of claim 1 wherein the step of converting the alternate word into keystroke data comprises the steps of:

storing the first spoken word in a memory; and
    storing the alternate word in the memory.

* * * * *